US011358486B2

(12) United States Patent
Li et al.

(10) Patent No.: US 11,358,486 B2
(45) Date of Patent: Jun. 14, 2022

(54) ELECTRIC POWERTRAIN WITH MULTI-PACK BATTERY SYSTEM

(71) Applicant: GM GLOBAL TECHNOLOGY OPERATIONS LLC, Detroit, MI (US)

(72) Inventors: Shifang Li, Shelby Township, MI (US); William T. Ivan, Shelby Township, MI (US); Brendan M. Conlon, Rochester Hills, MI (US); Yue Fan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 16/571,519

(22) Filed: Sep. 16, 2019

(65) Prior Publication Data

US 2021/0078429 A1   Mar. 18, 2021

(51) Int. Cl.
| | |
|---|---|
| *B60L 53/62* | (2019.01) |
| *H02P 5/74* | (2006.01) |
| *H02J 7/00* | (2006.01) |
| *B60L 58/12* | (2019.01) |
| *B60L 58/19* | (2019.01) |
| *B60L 50/50* | (2019.01) |
| *B60K 1/04* | (2019.01) |
| *B60L 58/22* | (2019.01) |
| *B60L 53/22* | (2019.01) |
| *B60L 53/16* | (2019.01) |
| *B60L 53/18* | (2019.01) |

(52) U.S. Cl.
CPC ............... *B60L 53/62* (2019.02); *B60K 1/04* (2013.01); *B60L 50/50* (2019.02); *B60L 58/12* (2019.02); *B60L 58/19* (2019.02); *B60L 58/22* (2019.02); *H02J 7/0024* (2013.01); *H02P 5/74* (2013.01); *B60L 53/16* (2019.02); *B60L 53/18* (2019.02); *B60L 53/22* (2019.02); *B60L 2210/30* (2013.01)

(58) Field of Classification Search
CPC .......... B60L 53/62; B60L 50/50; B60L 58/19; B60L 58/22; B60L 58/12; B60L 53/22; B60L 53/16; B60L 53/18; B60L 2210/30; B60K 1/04; H02J 7/0024; H02P 5/74
USPC .............................................. 180/65.8
See application file for complete search history.

(56) References Cited

U.S. PATENT DOCUMENTS 11,046,202 B2 *  6/2021  Zappaterra .............. B60L 58/19
11,065,975 B2 *  7/2021  Kristof .................... B60L 58/20
(Continued)

*Primary Examiner* — John D Walters
*Assistant Examiner* — Hilary L Johns
(74) *Attorney, Agent, or Firm* — Quinn IP Law

(57) ABSTRACT

A multi-pack battery system having at least first and second battery packs each with positive and negative terminals, and each with upper and lower switches respectively connected to the positive and negative terminals. The battery packs have a first voltage level, and are connectable in either series or parallel. A controller controls an ON/OFF state of the switches in response to input signals to select between two series charging modes, three parallel charging modes, and one or more propulsion modes. Some embodiments have a series propulsion mode. An electric powertrain system includes first and second power inverter modules ("PIMs"), an electrical load, front and rear electric machines connected to a respective one of the first and second PIMs, and the battery system. The powertrain system may selectively provide all-wheel, front-wheel, or rear-wheel drive capabilities in each of the various propulsion modes.

20 Claims, 4 Drawing Sheets

(56) References Cited

U.S. PATENT DOCUMENTS

2019/0126761 A1* 5/2019 Verbridge .......... H01M 10/441
2019/0165713 A1 5/2019 Namuduri et al.

* cited by examiner

| VOM | SA1 / SA2 | SA3 | SA4 | SA5 | SB1 / SB2 | SB3 | SB4 | SB5 |
|---|---|---|---|---|---|---|---|---|
| (1) CV2- SA | 1 / 1 | 1 | 0 | 1 | 0 / 0 | 0 | 1 | 1 |
| (2) CV2 - SB | 0 / 0 | 1 | 0 | 1 | 1 / 1 | 0 | 1 | 1 |
| (3) CV1 - p | 0/0 or 1/1 | 1 | 1 | 0 | 0/0 or 1/1 | 1 | 1 | 0 |
| (4) CV1 - A | 0/0 or 1/1 | 1 | 1 | 0 | 0/0 or 1/1 | 0 | 0 | 0 |
| (5) CV1 - B | 0/0 or 1/1 | 0 | 0 | 0 | 0/0 or 1/1 | 1 | 1 | 0 |
| (6) PV1 - p | 1 / 1 | 0 | 0 | 0 | 1 / 1 | 0 | 0 | 0 |
| (7) PV1 - A | 1 / 1 | 0 | 0 | 0 | 0 / 0 | 0 | 0 | 0 |
| (8) PV1 - B | 0 / 0 | 0 | 0 | 0 | 1 / 1 | 0 | 0 | 0 |

| VOM | SA1 / SA2 | SA3 | SA5 | SB1 / SB2 | SB4 | SB5 |
|---|---|---|---|---|---|---|
| (1) CV2 - SA | 1 / 1 | 1 | 1 | 0 / 0 | 1 | 1 |
| (2) CV2 - SB | 0 / 0 | 1 | 1 | 1 / 1 | 1 | 1 |
| (3) CV1 - p | 1 / 1 | 1 | 0 | 1 / 1 | 1 | 0 |
| (4) CV1 - A | 1 / 1 | 1 | 0 | 0 / 1 | 1 | 0 |
| (5) CV1 - B | 1 / 0 | 1 | 0 | 1 / 1 | 1 | 0 |
| (6) PV1 - p | 1 / 1 | 0 | 0 | 1 / 1 | 0 | 0 |
| (7) PV1 - A | 1 / 1 | 0 | 0 | 0 / 0 | 0 | 0 |
| (8) PV1 - B | 0 / 0 | 0 | 0 | 1 / 1 | 0 | 0 |

*Fig-5*

| VOM | SA1 / SA2 | SA3 | SA5 | SB1 / SB2 | SB4 | SB5 |
|---|---|---|---|---|---|---|
| (1) CV1 - p | 1 / 1 | 1 | 0 | 1 / 1 | 1 | 0 |
| (2) CV1 - A | 1 / 1 | 1 | 0 | 0 / 1 | 1 | 0 |
| (3) CV1 - B | 1 / 0 | 1 | 0 | 1 / 1 | 1 | 0 |
| (4) CV2 - s | 1 / 0 | 1 | 1 | 0 / 1 | 1 | 1 |
| (5) PV2 - s | 1 / 0 | 0 | 1 | 0 / 1 | 0 | 1 |
| (6) PV1 - A | 1 / 1 | 0 | 0 | 0 / 0 | 0 | 0 |
| (7) PV1 - B | 0 / 0 | 0 | 0 | 1 / 1 | 0 | 0 |

ELECTRIC POWERTRAIN WITH MULTI-PACK BATTERY SYSTEM

INTRODUCTION

The present disclosure relates to electric powertrains of the types used for propulsion aboard battery electric vehicles ("BEVs"), hybrid electric vehicles ("HEVs"), and other high-voltage mobile platforms. An electric powertrain often includes one or more polyphase/alternating current ("AC") rotary electric machines constructed from a wound stator and a magnetic rotor. Individual phase leads of the electric machine are connected to a power inverter, which in turn is connected to a direct current ("DC") voltage bus. When the electric machine functions as a traction motor, control of the ON/OFF switching states of semiconductor switches located within the power inverter is used to generate an AC output voltage at a level suitable for energizing the electric machine. The energized phase windings ultimately produce a rotating magnetic field with respect to the stator. The rotating stator field interacts with a rotor field to produce machine rotation and motor output torque.

A multi-cell DC battery is often used as a core part of a rechargeable energy storage system aboard a modern BEV, HEV, or another mobile high-voltage mobile platform. The battery, which is connected to the DC voltage bus, may be selectively recharged by an off-board charging station. When the charging station produces a charging voltage having an AC waveform, an AC-DC converter located aboard the particular platform being charged converts the AC charging waveform to a DC waveform suitable for charging the constituent battery cells of the battery. Alternatively, a DC fast-charging ("DCFC") station may be used as a relatively high-power/high-speed charging option.

The voltage ratings of multi-cell battery packs currently used for energizing propulsion functions of vehicles and other mobile platform continue to increase in order to extend a maximum electric driving range, as well as to improve overall drive performance. Fast-charging infrastructure and associated charging methodologies likewise continue to evolve in an effort toward keeping pace with battery pack hardware improvements. However, the deliberate pace of integration of higher-power DCFC stations with existing charging infrastructure and battery pack architectures should ensure the continued need for lower-power "legacy" charging stations, at least for the foreseeable future. Additionally, lower pack voltages remain advantageous, e.g., for cost-effective power electronics, and thus will continue to be used. As a result of the DCFC infrastructure trend and the continued existence of lower-voltage propulsion systems, the charging voltages provided by a given DCFC station may or may not match the voltage ratings or capacities of a given multi-cell battery pack.

SUMMARY

An electric powertrain is disclosed herein having a reconfigurable multi-pack battery system. While "multi-pack" is exemplified herein for illustrative simplicity as two battery packs, the present teachings may be extended to three or more battery packs in other embodiments, as will be readily appreciated by those of ordinary skill in the art, and therefore "multi" as used herein means "two or more" without an upper limit on the number of battery packs used in the battery system. Size, weight, packaging, and other such considerations may limit the actual number of battery packs used in a given architecture, however, and therefore the battery system described herein is representative of one possible practical embodiment of the present teachings.

In some embodiments, the multiple battery packs are connected in a parallel-connected ("P-connected") configuration during propulsion operations, and in either a P-connected or S-connected configuration during charging operations. For example, the P-connected configuration could provide for nominal 400V propulsion operations, with the S-connected configuration enabling nominal 800V charging. In other embodiments the propulsion mode may be a series propulsion mode, e.g., at the nominal 800V level. The disclosed multi-pack architecture also enables flexible use of a DC fast-charging ("DCFC") station for improved utilization of the station's available charging capability.

In a non-limiting exemplary embodiment, the electric powertrain includes a propulsion system and a connected electrical load collectively powered by a first voltage level ("V1"). The multiple battery packs used in the present disclosure are configured to receive a charge at the level of the first voltage level, or at a higher second voltage level ("V2") when a higher charging voltage is available via the DCFC station. That is, when the second voltage level is available, (n) battery packs are connected in series to increase the voltage capability of the battery system from V1 in the P-connected configuration to n(V1) in the S-connected configuration. The present architecture also supports multiple propulsion modes conducted at the first or second voltage level, with the various charging and propulsion modes described in detail herein. While the first voltage level is described herein in some examples as being 300V or more, the present teachings may be extended to lower voltage systems, e.g., 48V systems, without limitation. In other embodiments, the battery packs may be connected in series at V2 for propulsion, and upon initiating a charging request, the battery packs may be reconfigured to the P-connected arrangement in order to receive a charging voltage at V1, e.g., from a legacy charging station.

The battery packs are selectively connected/disconnected depending on the required operating mode, with this action performed via a controller using ON/OFF state control of upper and lower switches within each the battery packs. As used herein, the terms "upper" and "lower" respectively refer to a connection to a positive bus rail or negative bus rail of a DC voltage bus, as will be appreciated by those of ordinary skill in the art. The switches in combination with the multi-pack configuration enable charging at either of the voltage levels V1 or at V2 noted above, e.g., 300-500V and 600-1000V in a non-limiting embodiment, and also enables a more flexible use of single or dual-pack propulsion in all-wheel drive ("AWD"), front-wheel drive ("FWD"), or rear-wheel drive ("RWD") modes. Additionally, the present architecture is not limited to a particular propulsion mode, with AWD, FWD, or RWD being possible drive options depending on factors such as the present or expected battery power or state of charge, temperature, control configuration, etc.

Eight different operating modes are described herein, including five different charging modes and three different propulsion modes in one possible embodiment. Additionally, each battery pack may be electrically connected to an electrical load, for instance one or more power inverter modules ("PIMs"), auxiliary power modules ("APMs"), and/or other load devices or subsystems. The PIMs may be connected to a respective electric machine, which are operated as traction motors in the various propulsion modes. For simplicity, the term "electrical load" refers herein to the collective electrical load placed on the battery packs regardless of the number, location, or identity of the specific device or devices embodying such an electrical load. Therefore, other electrical load devices not described herein may contribute to the overall electrical load, such as but not limited to compressors, air conditioning control modules, power steering modules, and so forth.

During DC fast charging, the above-noted electrical loads may be selectively powered by a corresponding battery pack. For propulsion, the particular selection of battery packs to be used for powering a given drive axle may be made by the controller depending on the selected mode and factors such as battery power, state of charge, etc.

Of the five disclosed charging modes, two separate charging modes at the second voltage level V2 include a first mode, CV2-SA, where "C" represents "charging", "V2" represents the second voltage level (i.e., the charging voltage), "S" represents the series connection of the battery packs, and "A" refers to the nominal identity of the particular battery pack used to power the electrical load(s) during charging. The second mode, which is also denoted CV2-SB, uses the battery packs connected in series, with the nominal "B" battery pack providing power to the electrical load. Thus, modes (1) and (2) differ solely in the identity of the battery pack that is used for powering the electrical load. The flexibility of using either battery pack to power the electrical load provides various benefits, including allowing the states of charge of the battery packs to remain balanced. In this manner, the present teachings ensure that a particular one of the battery packs is not unduly stressed during operation relative to the remaining battery pack(s).

The five charging modes also include three charging modes conducted at the first voltage level V1. The three V1-level charging modes include a third mode (3), i.e., CV1-p, in which the battery packs are connected in parallel ("p") with the ability to connect/disconnect the electrical load from either battery pack, a fourth mode (4) abbreviated CV1-A in which battery pack "A" is charged at the first voltage level V1 while either battery pack powers the electrical load, and a fifth mode (5), also referred to as mode CV1-B, in which battery pack "B" is charged at the first voltage level V1 while, as with mode (4), either battery pack (or both) remains available to power the electrical load as needed.

The propulsion modes in some embodiments include V1-level propulsion modes, i.e., a sixth mode (6), which is a parallel mode PV1-p in which upper case "P" represents "propulsion" and lower case "p" represents a parallel electrical connection of the battery packs, and seventh and eighth modes (7) and (8), respectively, also referred to herein as modes PV1-A and PV1-B, in which required propulsion energy is provided by the indicated battery pack "A" or "B". In another embodiment, a series propulsion mode at V2 ("PV2-s") is possible for higher-voltage propulsion.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 2 is a schematic circuit diagram of an electric powertrain usable as part of the exemplary mobile platform shown in FIG. 1.

FIGS. 4-6 are tables of possible operating modes and corresponding switching states for the representative electric powertrain shown in FIGS. 2 and 3.

Figure 1:
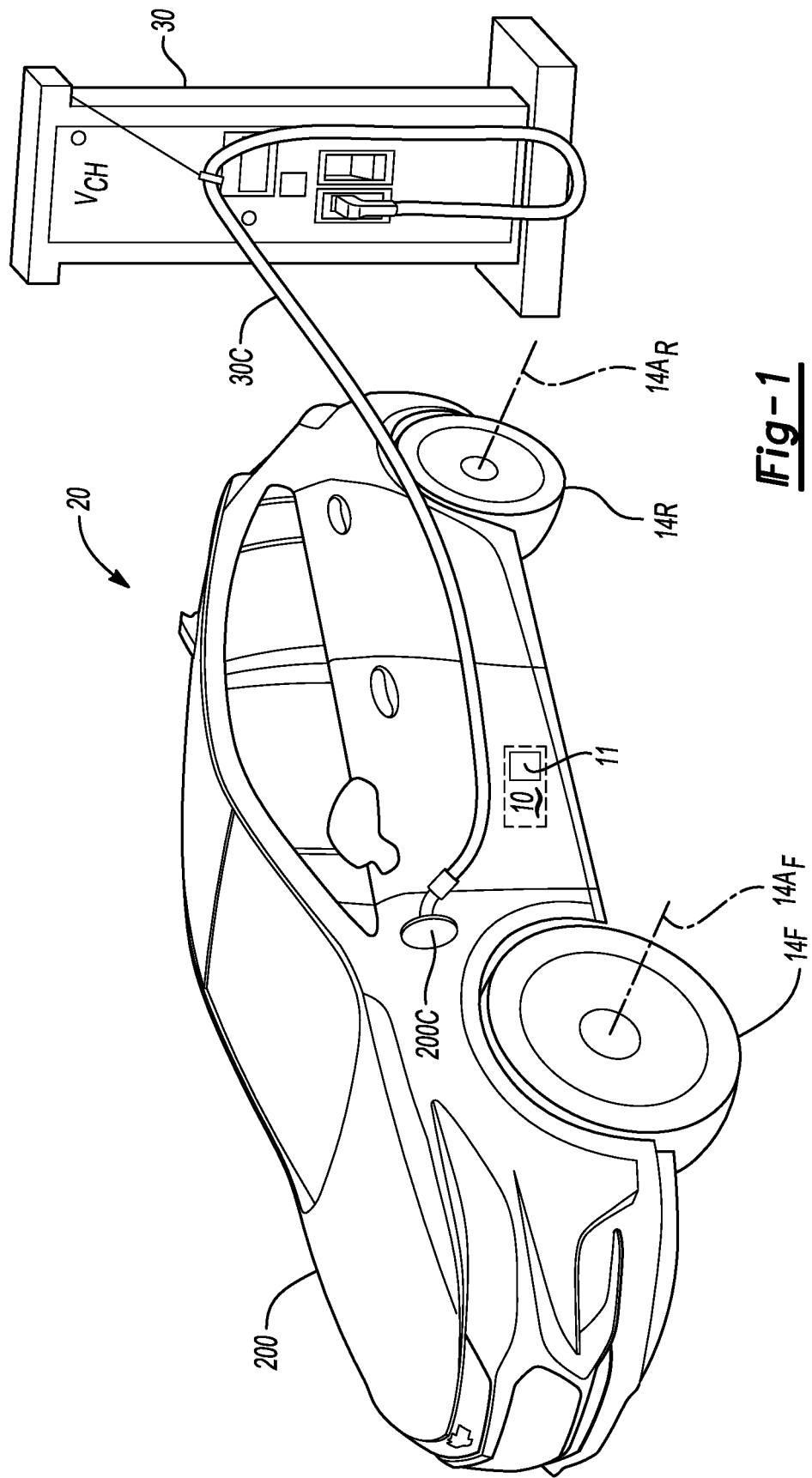
FIG. 1 is a schematic illustration of a mobile platform undergoing a direct current fast-charging ("DCFC") operation, with the mobile platform having a high-voltage multi-pack battery system constructed from multiple battery packs as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electric powertrain 10 is shown in FIG. 1 that includes a multi-pack battery system 11, the details of which are shown schematically in FIG. 1. The electric powertrain 10 may be used as part of a mobile platform 20 having a body 200. The mobile platform 20, described herein as a motor vehicle for illustrative consistency, may be alternatively embodied as a marine vessel, aircraft, rail vehicle, robot, etc., and therefore the present teachings are not limited to vehicular applications in general or automotive vehicles in particular.

The mobile platform 20 is depicted in FIG. 1 as undergoing a direct current fast-charging ("DCFC") operation. During such an operation, the battery system 11 (also see FIGS. 2 and 3) is electrically connected to an off-board DCFC station 30 via a vehicle charging port 200C. The electric powertrain 10 uses multiple battery packs, with two such battery packs 12A and 12B (see FIGS. 2 and 3) used in the simplified embodiments described below. Each of the battery packs 12A and 12B have a first voltage level ("V1"), e.g., 300-500V in a non-limiting exemplary embodiment.

The architectures described herein enables improved utilization of a charging voltage ("$V_{CH}$") of the DCFC station 30 at different voltage levels. For instance, the mobile platform 20 may be propelled at the first voltage level V1, and then reconfigured upon charging to receive a second voltage level ("V2") that is well in excess of the first voltage level V1, e.g., 600-1000V. The various propulsion modes enabled by the architecture described herein may include all-wheel drive ("AWD"), front-wheel drive ("FWD"), or rear-wheel drive ("RWD") propulsion modes depending on battery power, control configurations, and possibly other relevant factors. Another embodiment may encompass propulsion at V2 and charging at either voltage level V2 or V1, e.g., depending on the available maximum charging voltage from the charging station 30.

In FIG. 1, the charging port 200C is internally connected to a DC charge connector (not shown) using a length of high-voltage charging cable 30C. Also not depicted in FIG. 1 but well understood in the art, the terminal end of the charging cable 30C connecting to the charging port 200C may be embodied an SAE J1772 or another suitable charge connector. The present teachings are independent of the particular charging standard ultimately employed in a DCFC operation, and therefore the above-noted examples are merely illustrative. The battery system 11 of FIG. 1 may be variously embodied as a multi-cell lithium ion, zinc-air, nickel-metal hydride, or other suitable battery chemistry configuration, is selectively recharged via a charging voltage ("$V_{CH}$") from the DCFC station 30. The charging voltage $V_{CH}$ may equal the respective first or second voltage levels V1 or V2 noted above.

The mobile platform 20 may include front and rear road wheels 14F and 14R, respectively, with "front" and "rear" as used herein being relative to a normal forward-facing direction of travel. The front and rear road wheels 14F and 14R may be connected to separate front and rear drive axles 14$A_F$ and 14$A_R$. The front drive axles 14$A_F$ may power the front road wheels 14F in AWD and FWD modes. The rear drive axles 14$A_R$ may power the rear road wheels 14R in AWD and RWD modes depending on the configuration. The architecture of FIG. 3 and the switching control tables 60 and 160 of FIGS. 4 and 5 describe the associated hardware and switching combinations necessary for achieving the various charging or propulsion operating modes, with table 260 of FIG. 6 providing another embodiment for higher-voltage propulsion.

Figures 2, 4:
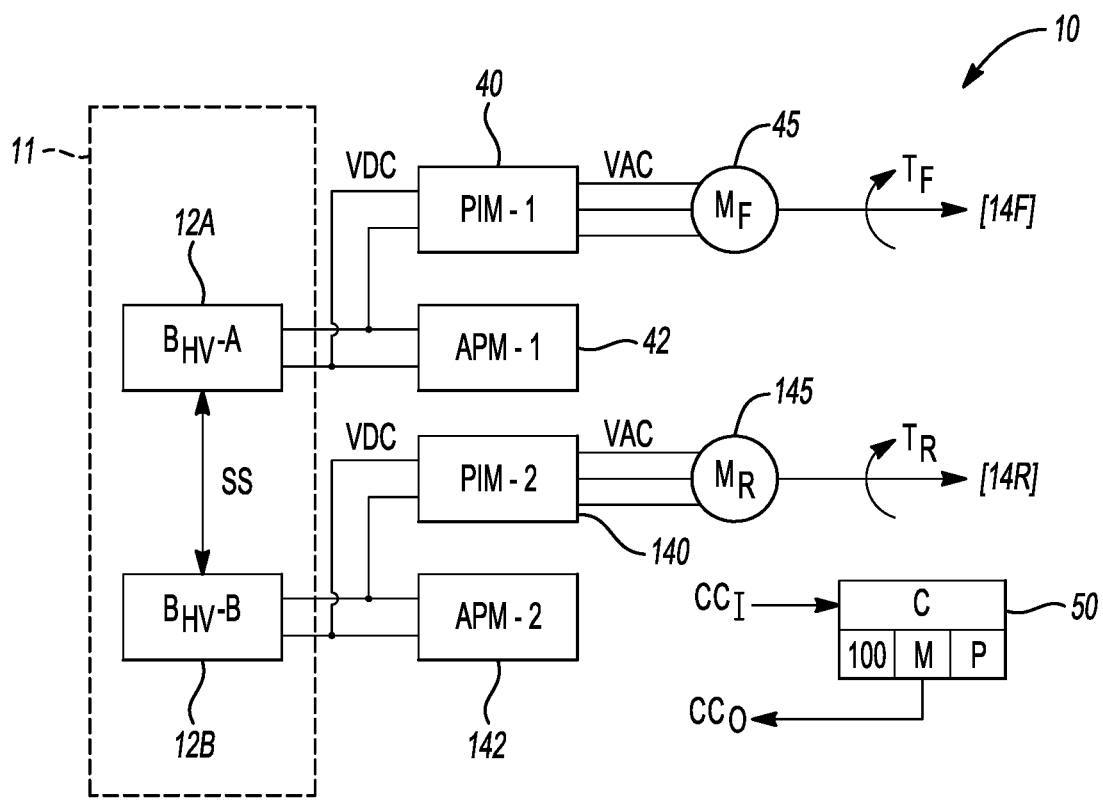

Referring to FIG. 2, when the mobile platform 20 of FIG. 1 operates in a drive/propulsion mode, switching control of the multi-pack battery system 11 is performed by a controller ("C") 50 to ultimately generate and deliver motor torque (arrow $T_F$ or arrow $T_R$) to the road wheels 14F and/or 14R and thereby propel the vehicle 20. In the charging operation depicted in FIG. 1, the controller 50 of FIG. 2 may likewise perform switching control operations to provide one of the various possible charging modes. When charging, the controller 50 is thus configured to select between series or parallel charging modes, as indicated by double-headed arrow SS, based at least in part on a charging capability of the DCFC station 30.

Referring to FIG. 2, the controller 50 has a processor ("Pr") and memory (M). The memory (M) includes tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry.

The controller 50 is programmed to execute instructions 100 embodying a switching control method, with the controller 50 receiving input signals (arrow $CC_I$) indicative of a driver-requested or autonomously-requested operating mode. In response to the input signals (arrow $CC_I$), the controller 50 outputs a set of switching control signals (arrow $CC_O$). The input signals (arrow $CC_I$) inclusive of an available charging voltage from the DCFC station 30 of FIG. 1 may be determined during charging as part of ongoing communication between the controller 50 and the DCFC station 30, e.g., upon connection of the vehicle 20 to the DCFC station 30, such as when the DCFC station 30 communicates its maximum charging voltage ($V_{CH}$) to the controller 50, as will be appreciated by those of ordinary skill in the art.

The electric powertrain 10 as shown schematically in FIG. 2 includes the above-noted battery system 11 having high-voltage battery packs 12A and 12B. The battery packs 12A and 12B, which are respectively labeled $B_{HV}$-A and $B_{HV}$-B, power an electrical load via a direct current voltage ("VDC"). The representative electrical load in a non-limiting exemplary embodiment may include a first power inverter module ("PIM-1") 40 and a first auxiliary power module ("APM-1") 42, with other devices being possible contributors the electrical load. The electrical load may also include a second power inverter module ("PIM-2") 140 and a second auxiliary power module ("APM-2") 142. The electrical load may be distributed to the front or the rear of the mobile platform 20 as shown based on packaging efficiency without limiting the electrical load to uses solely at a particular front or rear end of the mobile platform 20.

As will be appreciated, power inverter modules such as the PIM-1 40 and PIM-2 140 include IGBTs, MOSFETs, or other applicable-suitable semiconductor switches each having an ON/OFF state controlled via pulse-width modulation ("PWM"), pulse-density modulation ("PDM"), or another switching control technique. Likewise, an auxiliary power module such as the respective APM-1 42 and APM-2 142 are DC-DC voltage converters operable for reducing a supply voltage from a level present on a high-voltage DC bus to an auxiliary level, e.g., 12-15V. Auxiliary batteries (not shown) may also be connected to the APM-1 42 and APM-2 142, along with various auxiliary devices.

The electric powertrain 10 depicted in FIG. 2 may include front and rear polyphase electric machines ("$M_F$") 45 and ("$M_R$") 145 respectively connected to the PIM-1 40 and PIM-2 140 and energized by an alternating current voltage ("VAC"). The "front" and "rear" designations relate the torque function of the electric machines 45 and 145 to a particular front or rear drive axle 14$A_F$ or 14$A_R$ of FIG. 1, with the front electric machine 45 powering the road wheels 14F and front axle 14$A_F$ via output torque (arrow $T_F$) and the rear electric machine 145 powering the road wheels 14R and the rear axle 14$A_R$ of FIG. 1 via output torque (arrow $T_R$) in this particular embodiment. Thus, with both of the electric machines 45 and 145 operating in tandem, the vehicle 20 of FIG. 1 is provided with AWD capability. Operation of one of the electric machines 45 or 145 provides FWD or RWD capability. Loads on the electric powertrain 10 may be powered by either of the available battery packs 12A or 12B of FIG. 3 depending on the operating mode, as will now be described with reference to FIG. 3.

Figure 3:
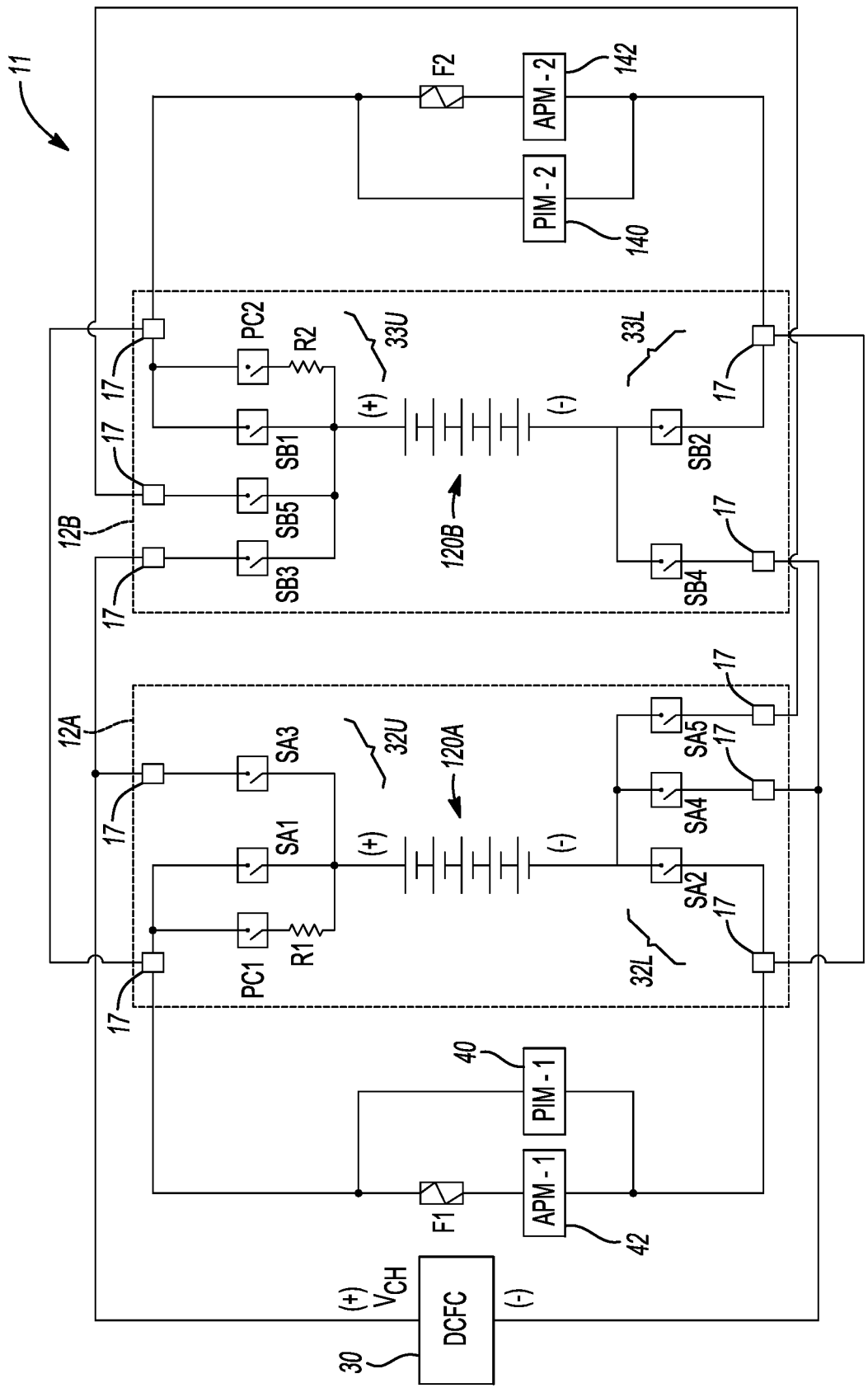
FIG. 3 is a schematic circuit topology describing a multi-pack architecture that may be used as part of the electric powertrain shown in FIG. 2.

Referring to FIG. 3, the DCFC station 30 is shown schematically to left of the multi-pack battery system 11 and connected thereto through a duration of a DC fast-charge process. The battery packs 12A and 12B have respective cell stacks 120A and 120B, with the particular configuration and battery chemistry of the cell stacks 120A and 120B being application-specific as noted above. The PIM-1 40 and APM-42 are selectively connected to/disconnected from the battery pack 12A via upper and lower switches 32U and 32L, together forming a switching circuit, in a particular combination that depends on the present or requested operating mode. A fuse ("F1") may be positioned in series with the APM-1 42, with additional fuses (not shown) possibly used in other configurations. Similarly, the PIM-2 140 and the APM-2 142 shown at far right in FIG. 2 are selectively connected to/disconnected from the battery pack 12B via upper and lower switches 33U and 33L, which together form another switching circuit, with a fuse F2 possibly being used in series with the APM-2 142 similar to the positioning and use of the fuse F1 located on the opposing side of the multi-pack battery system 11.

With respect to the upper and lower switches 32U and 32L of the battery pack 12A, the individual upper switches 32U controlled herein include switches SA1 and SA3. The lower switches 32L include switches SA2, SA4, and SA5, with "S" denoting a switch and "1-5" being nominal switch numbers. Additionally, the upper switches 32U may include a pre-charge switch PC1 in electrical series with a pre-charge resistor R1 and connected to the positive terminal, with "PC" representing a pre-charge function as explained below. The upper and lower switches 33U and 33L of battery pack 12B are similarly configured and labeled, i.e., as switches SB1, SB3, SB5, and PC2 forming the upper switches 33U and switches SB2 and SB4 forming the lower switches 33U, with a pre-charge resistor R2 in series with the pre-charge switch PC2.

The illustrated architecture of FIG. 3 may be arranged as shown or in a different manner, provided the indicated electrical connections are made, and provided the upper switches 32U and 33U and the lower switches 32L and 33L are individually controlled according to a switching control table 60 or 160 of FIG. 4 or 5. Electrical connection blocks 17 are used to make physical connections of lengths of cables or wires between the battery packs 12A and 12B to form the illustrated circuit topology.

Referring to FIG. 4, the switching control table 60 depicts the various vehicle operating modes ("VOM") made possible by the architecture of FIG. 3, i.e., five charging modes and four propulsion modes, for a total of eight operating modes abbreviated as modes (1)-(8). Switching control performed by the controller 50 of FIG. 2 is depicted with respect to the switches SA1-SA5 and SB1-SB5. As will be appreciated, the DC voltage bus is typically pre-charged prior to opening or closing the various switches 32U, 32L, 33U, and 33L, with the ON/OFF state of the pre-charge switches (PC1 and PC2) not otherwise affecting the operating modes described herein. Accordingly, the pre-charge switches PC1 and PC2 are omitted from FIGS. 4 and 5 for simplicity.

Still referring to FIG. 4, the switches SA1-SB5, which are shown in FIG. 3 as binary ON/OFF switches for illustrative simplicity, may be variously embodied as electro-mechanical switches such as contactors or relays, which can block current flow in either direction. Alternatively, the switches may be configured as application-suitable solid-state switches or relays, e.g., semiconductor switches such as IGBTs or MOSFETs. The binary ON/OFF switching states are represented as "1" and "0", respectively, with a "1" or "ON" state corresponding to a closed/conducting switch and a "0" or "OFF" state corresponding to an open/non-conducting switch, as will be understood by those of ordinary skill in the art. Where "1/0", "0/1", or "1/1" are shown, this numeric pair designates a state of the indicated switches SA1 and SA2 if power to the given load is needed ("1") or not needed ("0"). Additionally, the abbreviation "0/0" or "1/1" refers to the states of pairs of switches SA1/SB2 and SB1/SB2 both being 0 or both being 1, respectively.

Charging Modes

With respect to the available charging modes, i.e., modes (1), (2), (3), (4), and (5) in table 60 of FIG. 4, the first two modes (1) and (2) provide two separate higher-voltage charging modes, i.e., charging via the DCFC station 30 of FIGS. 1 and 3 that occurs at the second voltage level V2, e.g., 600-1000V in one possible embodiment. Modes (3), (4), and (5) provide three separate charging modes at the first voltage level of V1, for instance 400V in an exemplary embodiment in which V2 is nominally 800V. The charging modes (1) and (2), i.e., (CV2-SA) and (CV2-SB), respectively utilize the two battery packs 12A and 12B. In the non-limiting embodiment of the two battery packs 12A and 12B, for instance, the battery packs 12A and 12B, each at V1, are connected in series to effectively form a combined battery pack having a voltage capacity of 2V1.

In modes (1) and (2), battery pack 12A or battery pack 12B of FIG. 3 provides the required power to a connected electrical load during the fast-charge process. During charging via the DCFC station 30 at levels approaching or equaling the second voltage level V2, i.e., $V_{CH} \cong V2$, the switches SA3, SA5, SB4, and SB5 are closed ("1") to connect the battery packs 12A and 12B together in series. At least one of the upper and/or lower switches 32U/33U and/or 32L/33L of the first and second battery packs 12A and 12B is configured to close to thereby connect the battery system to the DCFC station 30 during various charging modes. For instance, each battery pack 12A and 12B could have a switch connected to its positive terminal and a switch connected to its negative terminal. Alternatively, one battery pack 12A or 12B could have one switch connected to its positive terminal and the other battery pack 12B or 12A could have one switch connected to its negative terminal.

During charging at the second voltage level V2, there may be a need at times to power an electrical load aboard the mobile platform 20, e.g., to thermally condition to the battery packs 12A or 12B, a cabin of the mobile platform 20, etc. Battery pack 12A provides such power when operating in mode (1). When operating in mode (2), this function is instead performed by battery pack 12B. The flexibility of using either battery pack 12A or 12B to energize the electrical load while simultaneously charging reduces the chances of a charge imbalance between the battery packs 12A and 12. Such an imbalance might otherwise occur if one of the battery packs 12A or 12B were used for this purpose during charging to the exclusion of the other battery pack 12B or 12A.

The controller 50 of FIG. 2 may be optionally configured to determine a state of charge ("SOC") difference between the battery pack 12A and the battery pack 12B, and to select operation in mode (3), mode (4), or mode (5) based on the SOC difference. The same may occur for the seventh (7) and eighth (8) modes of the propulsion modes described herein. In this manner the controller 50 may balance the respective SOCs and voltages of the first and second battery packs 12A and 12B. Modes (3), (4), and (5) provide three separate charging modes at the first voltage level V1. Mode (3), i.e., (CV1-p), connects the battery packs 12A and 12B in parallel ("p") and preserves the ability to connect/disconnect the electrical load(s) from either battery pack 12A or 12B. Mode (3) enables the mobile platform 20 of FIG. 1 to charge at the first voltage level V1 rather than at the second voltage level V2, which in turn provides charging flexibility when the DCFC station 30 is a V1-capable charging station.

In mode (4), i.e., (CV1-A), the battery pack 12A is charged at the first voltage level V1 while either battery pack 12A or 12B powers the connected electrical load. Mode (4) allows a balancing strategy to be used, e.g., a battery charger may "charge up", prior to connecting the battery packs 12A and 12B in parallel, whichever of the battery packs 12A or 12B has the lower state of charge or voltage capability. Such a difference may result due to aging, part variance, etc. Mode (5), i.e., (CV1-B), is analogous to mode (4), but charges battery pack 12B instead of battery pack 12A. As with mode (4), either battery pack 12A or 12B remains available to power the electrical load(s) during charging.

Propulsion Modes

In one possible configuration, modes (6), (7), and (8) provide different parallel propulsion modes at the first voltage level V1, with mode (6) being a parallel mode (PV1-p) in which the battery packs 12A and 12B are connected in parallel, e.g., in AWD, FWD, or RWD propulsion modes, and modes (7) and (8), i.e., (PV1-A) and (PV1-B) in which propulsion energy is provided by battery pack 12A or 12B, respectively. The controller 50 may be optionally configured to select mode (6), mode (7), or mode (8) based on a corresponding fault status of battery packs 12A and 12B, with mode (6) possibly being a "fault-free" default mode when neither of the battery packs 12A and 12B experiences a fault. Mode (6) may therefore be used as a "normal" or "fault-free" operating mode when the two battery packs 12A and 12B together provide power in the AWD, FWD, or RWD mode. In general, for modes (6), (7), and (8), the mobile platform 20 may be operated in AWD, FWD, or RWD depending on battery power levels, control strategy and hardware configuration, e.g., one or two of the electric machines 45 and/or 145.

Modes (7) and (8), i.e., (PV1-A) and (PV1-B), respectively, may be used to provide performance flexibility during a single pack failure mode in which one of the battery packs 12A or 12B is unable to provide propulsion power, e.g., during a detected short circuit or open circuit condition, a low state of charge or voltage capability, temperature limits, etc. The remaining "healthy" battery pack remains able to drive the electric machine 45 and/or 145, albeit with reduced power. Thus, a "single pack" drive mode is enabled by modes (7) and (8), with propulsion in mode (7) being energized by battery pack 12A and propulsion in mode (8) being energized by battery pack 12B.

As described in table 260 of FIG. 6, another embodiment provides for seven different operating modes (1)-(7) for a higher-voltage series propulsion configuration of the first and second battery packs 12A and 12B. Table 260 depicts the various ON/OFF states of the switches SA1, SA2, SA3, SA5, SB1, SB2, SB3, and SB5 of FIG. 3, and thus FIG. 6 is analogous to table 160 of FIG. 5. Thus, modes (1), (2), and (3) correspond to modes (3), (4), and (5) of FIG. 5, i.e., charging at the level of V1. Mode (4) is a series charge mode at voltage level V2 ("CV2-s"), i.e., both battery packs 12A and 12B are recharged at V2. Unique to table 260 is a series propulsion ("PV2-s") at the higher voltage level V2, in which the first and second battery packs 12A and 12B are connected in series while the mobile platform 20 is electrically propelled. As will be appreciated, the necessary power electronics and hardware of the mobile platform 20 would be rated for the higher voltage level of V2, and thus the need for V1-level propulsion modes is minimized, with such modes possibly being maintained as optional modes (6) and (7) of FIG. 6 for use during certain fault conditions that might preclude propulsion operations at the higher voltage level V2.

In such a mode, the controller 50 may be configured, in response to the input signals (arrow $CC_I$ of FIG. 1), to transition from the series propulsion mode at V2 or a single-pack propulsion mode at V1 to one of the above-described parallel charging modes at V1, e.g., when the maximum charging voltage from the charging station 30 is at the lower level of V1 and not V2. The controller 50 may accomplish such a transition using the multiple switches of the first and second battery packs 12A and 12B. Therefore, a scenario may be contemplated in which propulsion occurs at the higher second voltage level V2 using a series connection of the battery packs 12A and 12B. Upon connecting to the DCFC station 30, the battery packs 12A and 12B may be selectively reconfigured in parallel to enable lower-voltage charging. In this manner, backward compatibility of the battery packs 12A and 12B with a lower-voltage DCFC station 30 is enabled.

It is possible to eliminate some of switches from the circuit topology of FIG. 3, i.e., either the pair of switches SA3 and SB4 or the pair of switches SA4 and SB3. A switching control table 160 is thus shown in FIG. 5 that is analogous to the switching control table 60 of FIG. 4, and thus depicts the five charging modes and four possible propulsion modes corresponding to modes (1)-(9). To further simplify the topology of FIG. 3, the switches SA5 and SB5 in FIG. 3 form the series connection of the battery packs 12A and 12B. If the series connection is moved outside of the battery packs 12A and 12B, the two switches SA5 and SB5 may be replaced by a single switch.

As will be appreciated by one of ordinary skill in the art, the circuit topology noted above may be used with electric vehicles and other systems having increased high-power charging requirements. With legacy DC fast-charging infrastructure generally on the order of 300-500V, the disclosed multi-pack battery system enables use of two or more battery packs, e.g., the battery packs 12A and 12B, to provide FWD, RWD, or AWD propulsion capability to the mobile platform 20 of FIG. 1 as needed, with legacy or high-power charging both being options, and while preserving the capability of powering connected loads during charging.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A multi-pack battery system for a mobile platform having an electrical load, a first electric machine, and a second electric machine, the multi-pack battery system comprising:

first and second battery packs each having multiple switches, the multiple switches including upper switches and lower switches respectively connected to a positive terminal and a negative terminal of the first and second battery packs, wherein the first and second battery packs each have a first voltage level; and a controller configured to control an ON/OFF state of each of the upper and lower switches of the first and second battery packs in response to input signals to thereby selectively establish:

two series charging modes conducted at a second voltage level that exceeds the first voltage level, and in which the first and second battery packs are connected in series, including a first mode in which the first battery pack powers the electrical load and a second mode in which the second battery pack powers the electrical load;

three parallel charging modes conducted at the first voltage level, including a third mode in which the first battery pack and the second battery pack are connected in parallel and concurrently charged, a fourth mode in which the first battery pack alone is charged, and a fifth mode in the second battery pack alone is charged, wherein either or both of the first or second battery packs powers the electrical load during the fourth mode and the fifth mode; and three propulsion modes conducted at the first voltage level in which torque from the first and/or second electric machine propels the mobile platform, including a sixth mode in which the first and second battery packs are connected on parallel to concurrently energize one or both of the electric machines, a seventh mode in which the first battery pack alone is used to energize one or both of the electric machines, and an eighth mode in which the second battery pack alone is used to energize one or both of the electric machines.

2. The battery system of claim 1, wherein the mobile platform is a motor vehicle having a front axle and a rear axle respectively connected to front road wheels and rear road wheels, and wherein the front road wheels and/or the rear road wheels are powered in each of the at least four propulsion modes using the torque from the first electric machine and/or the second electric machine.

3. The battery system of claim 1, wherein the first voltage level is 300V or more, and the second voltage level is at least twice the first voltage level.

4. The battery system of claim 1, wherein the upper switches of the first and second battery packs include a pre-charge switch connected in series with a pre-charge resistor.

5. The battery system of claim 1, wherein the controller is configured to close one or two of the upper and/or lower switches of the first and/or second battery packs to connect the first and second battery packs in series and thereby establish the two series charging modes.

6. The battery system of claim 1, wherein one or two pairs of the switches of the first and second battery packs are closed to thereby connect the battery system to an offboard charging station during the two series charging modes and the three parallel charging modes.

7. The battery system of claim 1, wherein the controller is configured to determine a difference between respective states of charge ("SOCs") and voltages of the first and second battery pack, and to select between the third mode, the fourth mode, or the fifth mode of the charging modes, and the seventh mode and the eighth mode of the propulsion modes, based on the difference to thereby balance the respective SOCs and voltages of the first and second battery packs.

8. The battery system of claim 1, wherein the controller is configured to select between the sixth mode, the seventh mode, and the eighth mode based on a corresponding electrical fault status of the first battery pack and the second battery pack, with the sixth mode being a default mode when neither the first battery pack nor the second battery pack has an electrical fault.

9. An electric powertrain system for a mobile platform having a front drive axle and a rear drive axle, the electric powertrain system comprising:
a first power inverter module ("PIM") and a second PIM;
an electrical load;
front and rear rotary electric machines connected to a respective one of the first PIM and the second PIM, and each having a rotor respectively connected to the front drive axle and the rear drive axle;
a first battery pack having positive and negative terminals, and having upper switches and lower switches respectively connected to the positive and negative terminals of the first battery pack;
a second battery pack having positive and negative terminals, and having upper switches and lower switches respectively connected to the positive and negative terminals of the second battery pack; wherein each of the first and second battery packs has a first voltage level; and
a controller configured to control an ON/OFF state of each of the upper and lower switches of the first and second battery packs in response to input signals to thereby selectively establish:
two series charging modes each conducted at a second voltage level that is at least twice the first voltage level, and in which the first and second battery packs are connected in series, including a first mode in which the first battery pack powers the electrical load and a second mode in which the second battery pack powers the electrical load;
three parallel charging modes each conducted at the first voltage level, including a third mode in which the first battery pack and the second battery pack are connected in parallel and concurrently charged, a fourth mode in which the first battery pack alone is charged, and a fifth mode in the second battery pack alone is charged, wherein either or both of the first or second battery packs powers the electrical load during the fourth mode and the fifth mode; and
three propulsion modes conducted at the first voltage level in which torque from one or both of the rotary electric machines propels the mobile platform, including a sixth mode in which the first and second battery packs are connected in parallel and concurrently energize one or both of the rotary electric machines, a seventh mode in which the first battery pack alone is used to energize one or both of the electric machines, and an eighth mode in which the second battery pack alone is used to energize one or both of the electric machines.

10. The electric powertrain system of claim 9, wherein the first voltage level is 300V or more, and the second voltage level is twice the first voltage level.

11. The electric powertrain system of claim 9, wherein the controller is configured to close one or two of the upper and/or lower switches of the first and/or second battery packs to connect the first and second battery packs in series, and to thereby establish the two series charging modes.

12. The electric powertrain system of claim 9, wherein one or two pairs of the switches of the first and second battery packs are closed to thereby connect the battery system to an offboard charging station during the two series charging modes and the three parallel charging modes.

13. The electric powertrain system of claim 9, wherein the upper and lower switches of the first and second battery packs are solid-state switches or relays.

14. The electric powertrain system of claim 9, wherein the controller is configured to determine a charging voltage of an offboard charging station, and to select between the series and parallel charging modes based at least in part on the charging voltage.

15. The electric powertrain system of claim 9, wherein the controller is configured to determine a difference between respective states of charge ("SOCs") and voltages of the first and second battery pack, and to select between the third mode, the fourth mode, or the fifth mode of the charging modes and the seventh and eight mode of the propulsion modes based on the difference to thereby balance the respective SOCs and voltages of the first and second battery packs.

16. The electric powertrain system of claim 9, wherein the controller is configured to select between the sixth mode, the seventh mode, and the eighth mode based on a corresponding electrical fault status of the first battery pack and the second battery pack, with the sixth mode being a default mode when neither the first battery pack nor the second battery pack has an electrical fault.

17. The electric powertrain system of claim 9, wherein the controller is configured to selectively deliver torque to the front drive axle and/or the rear drive axle in each of the three parallel propulsion modes based on the input signals to thereby selectively provide an all-wheel drive, front-wheel drive, and a rear-wheel drive capability in each of the three parallel propulsion modes.

18. An electric powertrain system for a mobile platform having a front drive axle and a rear drive axle, the electric powertrain system comprising:
 a first power inverter module ("PIM") and a second PIM;
 an electrical load;
 front and rear rotary electric machines connected to a respective one of the first PIM and the second PIM, and each having a rotor respectively connected to the front drive axle and the rear drive axle;
 a first battery pack having positive and negative terminals, and having upper switches and lower switches respectively connected to the positive and negative terminals of the first battery pack;
 a second battery pack having positive and negative terminals, and having upper switches and lower switches respectively connected to the positive and negative terminals of the second battery pack, wherein each of the first and second battery packs has a first voltage level; and
 a controller configured to control an ON/OFF state of each of the upper and lower switches of the first and second battery packs in response to input signals to thereby selectively establish:
  a series charging mode conducted at a second voltage level that exceeds the first voltage level and in which the first and second battery packs are connected in series, and in which the first and second battery packs power the electrical load;
  three parallel charging modes each conducted at the first voltage level, including a third mode in which the first battery pack and the second battery pack are connected in parallel and concurrently charged, a fourth mode in which the first battery pack alone is charged, and a fifth mode in the second battery pack alone is charged, wherein either or both of the first or second battery packs powers the electrical load during the fourth mode and the fifth mode;
  a series propulsion mode as sixth mode in which the first and second battery packs are connected in series to concurrently energize one or both of the electric machines at the second voltage level, wherein in the series propulsion mode torque from one or both of the rotary electric machines propels the mobile platform; and
  two single-pack propulsion modes conducted at the first voltage level in which torque from one or both of the rotary electric machines propels the mobile platform, including a seventh mode in which the first battery pack alone is used to energize one or both of the electric machines, and an eighth mode in which the second battery pack alone is used to energize one or both of the electric machines.

19. The electric powertrain of claim 18, wherein the controller is configured to control the ON/OFF state of each of the upper and lower switches of the first and second battery packs in response to the input signals to thereby selectively establish the series propulsion mode; and
 in response to the input signals, the controller is configured to transition the battery system from the series propulsion mode or one of the single-pack propulsion modes to one of the parallel charging modes via the multiple switches of the first and second battery packs.

20. The electric powertrain of claim 19, wherein the controller is configured to determine a charging voltage of an offboard charging station in response to the input signals, and to select between the series and parallel charging modes based at least in part on the charging voltage.

* * * * *